United States Patent
Lin

(10) Patent No.: US 7,802,013 B2
(45) Date of Patent: Sep. 21, 2010

(54) METHOD FOR TRANSMITTING DATA

(75) Inventor: Duncan Ta-Te Lin, Taipei (TW)

(73) Assignee: Inventec Corporation, Taipei (TW)

( * ) Notice: Subject to any disclaimer, the term of this patent is extended or adjusted under 35 U.S.C. 154(b) by 331 days.

(21) Appl. No.: 12/051,522

(22) Filed: Mar. 19, 2008

(65) Prior Publication Data
US 2009/0240837 A1  Sep. 24, 2009

(51) Int. Cl.
G06F 15/16 (2006.01)
(52) U.S. Cl. .................. 709/246; 709/236; 370/235
(58) Field of Classification Search .......... 709/246, 709/236; 370/230, 235, 389; 375/240.03; 704/205
See application file for complete search history.

(56) References Cited

U.S. PATENT DOCUMENTS

| | | | |
|---|---|---|---|
| 2004/0170163 A1* | 9/2004 | Yik et al. | 370/389 |
| 2005/0002336 A1* | 1/2005 | Wego et al. | 370/235 |
| 2006/0126510 A1* | 6/2006 | Russell | 370/235 |
| 2006/0165190 A1* | 7/2006 | Tamaki et al. | 375/262 |
| 2006/0280242 A1* | 12/2006 | Ugur | 375/240.03 |
| 2007/0150616 A1* | 6/2007 | Baek et al. | 709/246 |
| 2008/0097751 A1* | 4/2008 | Tsuchinaga et al. | 704/205 |
| 2008/0219161 A1* | 9/2008 | Lee et al. | 370/230 |

* cited by examiner

Primary Examiner—Jungwon Chang
(74) Attorney, Agent, or Firm—J.C. Patents

(57) ABSTRACT

A data transmission method suitable for transmitting a first data table from a server to a mobile device is provided, wherein the first data table has a plurality of first data fields. The data transmission method includes following steps. A maximum used bit number of each of the first data fields is identified, wherein when the maximum used bit number of one of the first data fields is 0, the first data field is deleted so as to form a second data table. The second data table is then transmitted to the mobile device.

9 Claims, 3 Drawing Sheets

| Upper bit number limit of each field in first data table | | | | | | | |
|---|---|---|---|---|---|---|---|
| 20 | 55 | 40 | 25 | 25 | 30 | 30 | 40 |

FIG. 2A

| First data table | | | | | | | |
|---|---|---|---|---|---|---|---|
| Last name | First name | Cell phone | Home phone | Company phone | Company name | Job title | e-mail |
| Lin | Yishing | 0920123456 | 0228810721 | 0228810725 | Inventec | | lin.yishing@invnetec.com |
| Liaw | Bow | 0922123456 | | 0228810726 | BenQ | | liaw.bow@benq.com |
| Su | Jully | 0916123456 | 0228810723 | 0228810727 | Inventec | | su.jully@invnetec.com |
| Chen | Wayne | 0918123456 | 0228810724 | | Samsung | | |

FIG. 2B

| Maximum used bit number of each field in first data table | | | | | | | |
|---|---|---|---|---|---|---|---|
| 4 | 7 | 10 | 10 | 10 | 8 | 0 | 24 |

FIG. 2C

| Second data table | | | | | | |
|---|---|---|---|---|---|---|
| Last name | First name | Cell phone | Home phone | Company phone | Company name | e-mail |
| Lin | Yishing | 0920123456 | 0228810721 | 0228810725 | Inventec | lin.yishing@invnetec.com |
| Liaw | Bow | 0922123456 | | 0228810726 | BenQ | liaw.bow@benq.com |
| Su | Jully | 0916123456 | 0228810723 | 0228810727 | Inventec | su.jully@invnetec.com |
| Chen | Wayne | 0918123456 | 0228810724 | | Samsung | |

FIG. 3A

| Upper bit number limit of each field in second data table | | | | | | |
|---|---|---|---|---|---|---|
| 4 | 7 | 10 | 10 | 10 | 8 | 24 |

FIG. 3B ated according to the updated upper bit number limit of each of the data fields. Finally, the second data table is transmitted to the mobile device.
METHOD FOR TRANSMITTING DATA

BACKGROUND OF THE INVENTION

1. Field of the Invention

The present invention generally relates to a method for transmitting data, in particular, to a method for transmitting a simplified data table.

2. Description of Related Art

Along with the forthcoming of the digital era, mobile communication devices (for example, cell phones and personal digital assistants) have become commonly used because they are simple to use and convenient to carry around. And along with the advancement of communication technology, users can instantly send video data, emails, short messages, and multimedia messages or even download data files in large quantity from servers by using mobile communication devices.

However, a mobile communication device usually has only very limited storage space. Accordingly, while downloading data of large quantity from a server, the download process may be terminated due to insufficient memory space in the mobile communication device. Moreover, even if the data is successfully downloaded into the mobile communication device, the problem of insufficient memory space may be incurred when the mobile communication device executes other functions since almost the entire memory space of the mobile communication device is taken by the downloaded data.

SUMMARY OF THE INVENTION

Accordingly, the present invention is directed to a data transmission method, wherein the bit number of a data to be transmitted is reduced.

The present invention is also directed to a data transmission method, wherein a data in a large quantity can be transmitted smoothly from a database of a server to a mobile device.

The present invention provides a data transmission method suitable for transmitting a first data table from a server to a mobile device, wherein the first data table has a plurality of data fields, and each of the data fields has an upper bit number limit. The data transmission method includes following steps. First, a maximum used bit number of each of the data fields is calculated in the server. After that, the maximum used bit number of each of the data fields is identified. When the maximum used bit number of one of the data fields is 0, the upper bit number limit of the data field is updated to reduce the upper bit number limit. When the maximum used bit number of one of the data fields is not 0, the upper bit number limit of the data field is updated to be equal to the maximum used bit number. Next, a second data table is generated according to the updated upper bit number limit of each of the data fields. Finally, the second data table is transmitted to the mobile device.

According to an embodiment of the present invention, a first total bit number of the first data table is greater than a second total bit number of the second data table.

According to an embodiment of the present invention, each of the upper bit number limits is greater than or equal to the corresponding maximum used bit number.

According to an embodiment of the present invention, the step of updating the upper bit number limit of the data field to reduce the upper bit number limit further includes reducing the upper bit number limit to 1.

According to an embodiment of the present invention, the step of updating the upper bit number limit of the data field to reduce the upper bit number limit further includes deleting the data field.

The present invention further provides a data transmission method suitable for transmitting a first data table from a server to a mobile device, wherein the first data table has a plurality of first data fields. The data transmission method includes following steps. A maximum used bit number of each of the first data fields is identified. When the maximum used bit number of one of the first data fields is 0, the first data field is deleted so as to generate a second data table. The second data table is then transmitted to the mobile device.

According to an embodiment of the present invention, a first total bit number of the first data table is greater than a second total bit number of the second data table.

According to an embodiment of the present invention, the step of identifying the maximum used bit number of each of the first data fields further includes updating a first upper bit number limit of one of the data fields to be equal to the maximum used bit number of the data field when the maximum used bit number of the data field is not 0, so as to generate the second data table. In addition, the second data table has a plurality of second data fields respectively corresponding to the first data fields, and a second upper bit number limit of each of the second data fields is equal to the maximum used bit number of the corresponding first data field.

In the present invention, before transmitting a data table from a server to a mobile device, the usage state of each data field in the data table is first identified. Those data fields having 0 used bit number are deleted, or the upper bit number limits of these data fields are set to 1. Namely, those data fields containing no data are deleted, or the upper bit number limits of these data fields are set to the lowest value. Through foregoing steps, a data table taking up a lot of memory space in the server is reduced into a simplified data table which takes less memory space so that the simplified data table can be smoothly transmitted to the mobile device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A illustrates the upper bit number limits of data fields in a first data table in a server.

FIG. 2B illustrates the content of the first data table in FIG. 2A.

FIG. 2C illustrates the maximum used bit numbers of the data fields in the first data table in FIG. 2B.

FIG. 3A illustrates the content of a second data table generated by simplifying the first data table in FIG. 2A.

FIG. 3B illustrates the upper bit number limits of the data fields in a second data table in a server.

DESCRIPTION OF THE EMBODIMENTS

Figure 1:
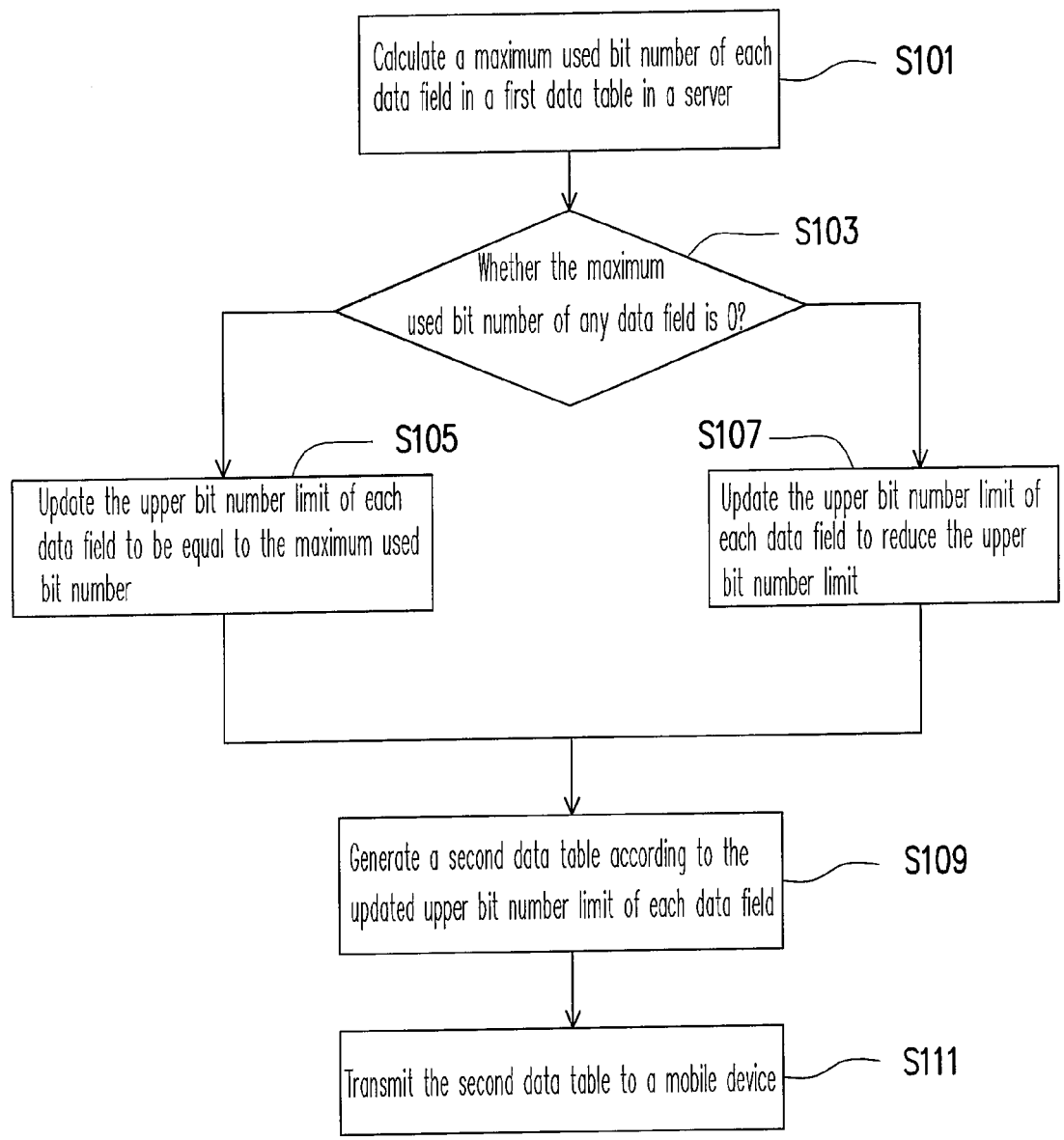
FIG. 1 is a flowchart of a data transmission method according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a flowchart of a data transmission method according to an embodiment of the present invention. FIG. 2A illustrates the upper bit number limits of data fields in a first data table in a server. FIG. 2B illustrates the content of the first data table in FIG. 2A. FIG. 2C illustrates the maximum used bit numbers of the data fields in the first data table in FIG. 2B. Referring to FIG. 1, FIG. 2A, and FIG. 2B, a first data table stored in a server has a plurality of data fields, wherein an upper bit number limit is set to each of the data fields (as shown in FIG. 2A). The upper bit number limit refers to the maximum number of data bits can be stored in a data field. In step S101, the maximum used bit number of each data field (i.e. the maximum number of data bits stored in the items of the same data field) is calculated according to the number of data bits filled into each item of each data field in the first data table. The upper bit number limit in each of the data fields is greater than or equal to the corresponding maximum used bit number.

Taking the "email" field in the first data table as an example, among the four items belonging to the "email" field, if one character takes up one bit, then data "lin.yishing@invnetec.com" takes up 24 bits, data "liaw.bow@benq.com" takes up 17 bits, data "su.jully@invnetec.com" takes up 21 bits, and no data is stored in the last item of the "email" therefore the used bit number thereof is 0. Accordingly, the maximum used bit number of the "email" field is 24.

After that, in step S103, the maximum used bit number of each of the data fields is identified so as to determine whether the maximum used bit number of the data field is 0. In other words, if there is no data stored into all the rows of a data field, the maximum used bit number of the data field is 0. When the maximum used bit number of one of the data field is 0 (for example, the "job title" field as shown in FIG. 2B), the upper bit number limit of the data field is updated, namely, the upper bit number limit of the data field is reduced (step S105). The upper bit number limit of the data field may be reduced to 1 or 0, namely, the data field is deleted.

However, when the maximum used bit number of one of the data fields is not 0 (for example, the "last name", "first name", "cell phone", "home phone", "company phone", "company name", and "email" fields in FIG. 2B), the upper bit number limit of the data field is updated to be equal to the maximum used bit number thereof (step S107). Namely, the maximum used bit number of each data field in FIG. 2C is used as the upper bit number limit of the data field in FIG. 2A.

Thereafter, a second data table is generated according to the updated upper bit number limit of each data field, as shown in FIG. 3A (step S109), wherein the upper bit number limit of each data field in the second data table (FIG. 3B) is equal to the corresponding maximum used bit number in the first data table (FIG. 2C). After that, the second data table is transmitted to a mobile device. Additionally, the first total bit number of the first data table is greater than the second total bit number of the second data table. In other words, the second data table takes up less memory space than the first data table.

In overview, according to the present invention, before transmitting a data table from a server to a mobile device, the usage state of each data field in the data table is first identified. Those data fields having 0 used bit number are deleted, or the upper bit number limits of these data fields are set to 1. Namely, those data fields containing no data are deleted, or the upper bit number limits of these data fields are set to the lowest value. Through foregoing steps, the data table in a large quantity in the server can be reduced into a simplified data table which takes less memory space so that the simplified data table can be smoothly transmitted to the mobile device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data transmission method, suitable for transmitting a first data table from a server to a mobile device, wherein the first data table comprises a plurality of data fields, and each of the data fields has an upper bit number limit, the data transmission method comprising:
   calculating a maximum used bit number of each of the data fields in the server;
   identifying the maximum used bit number of each of the data fields, wherein
      when the maximum used bit number of one of the data fields is 0, the upper bit number limit of the data field is updated so as to reduce the upper bit number limit,
      when the maximum used bit number of one of the data fields is not 0, the upper bit number limit of the data field is updated to be equal to the maximum used bit number of the data field;
   generating a second data table according to the updated upper bit number limit of each of the data fields; and
   transmitting the second data table to the mobile device.

2. The data transmission method according to claim 1, wherein a first total bit number of the first data table is greater than a second total bit number of the second data table.

3. The data transmission method according to claim 1, wherein each of the upper bit number limits is greater than or equal to the corresponding maximum used bit number.

4. The data transmission method according to claim 1, wherein the step of updating the upper bit number limit of the data field to reduce the upper bit number limit further comprises reducing the upper bit number limit to 1.

5. The data transmission method according to claim 1, wherein the step of updating the upper bit number limit of the data field to reduce the upper bit number limit further comprises deleting the data field.

6. A data transmission method, suitable for transmitting a first data table from a server to a mobile device, wherein the first data table comprises a plurality of first data fields, the data transmission method comprising:
   identifying a maximum used bit number of each of the first data fields, wherein
      when the maximum used bit number of one of the first data fields is 0, the first data field is deleted so as to generate a second data table; and
   transmitting the second data table to the mobile device.

7. The data transmission method according to claim 6, wherein a first total bit number of the first data table is greater than a second total bit number of the second data table.

8. The data transmission method according to claim 6, wherein the step of identifying the maximum used bit number of each of the first data fields further comprises updating a first upper bit number limit of the data field to be equal to the maximum used bit number of the data field when the maximum used bit number of the data field is not 0, so as to generate the second data table.

9. The data transmission method according to claim 8, wherein the second data table comprises a plurality of second data fields respectively corresponding to the first data fields, and a second upper bit number limit of each of the second data fields is equal to the maximum used bit number of the corresponding first data field.

* * * * *